United States Patent [19]

Nixon et al.

[11] 4,347,607
[45] Aug. 31, 1982

[54] VOICE ALARM SIGNALLING SYSTEM

[75] Inventors: Thomas J. Nixon, Gaithersburg, Md.; Harold Iley, Huntsville, Ala.

[73] Assignee: Harris Corporation, Melbourne, Fla.

[21] Appl. No.: 148,286

[22] Filed: May 9, 1980

[51] Int. Cl.³ .............................................. H04L 5/00
[52] U.S. Cl. ................................ 370/110.1; 370/111; 179/2 R
[58] Field of Search ............. 370/55, 84, 94, 110, 370/111, 191; 179/1 VL, 2 R; 455/38, 52; 375/5, 40; 340/825.01, 825.03

[56] References Cited

U.S. PATENT DOCUMENTS

| | | | |
|---|---|---|---|
| 3,542,957 | 11/1970 | Mitchell | 370/111 |
| 3,549,814 | 12/1970 | Jaeger | 370/110 |
| 3,634,627 | 1/1972 | Velentini | 370/110 |
| 3,864,521 | 2/1975 | DeLong | 370/91 |
| 3,911,218 | 10/1975 | Suzuki | 370/92 |
| 4,168,399 | 9/1979 | D'Amico | 179/1 VL |
| 4,227,248 | 10/1980 | Munter | 370/110 |

Primary Examiner—Benedict V. Safourek
Assistant Examiner—Stephen Chin
Attorney, Agent, or Firm—Craig and Antonelli

[57] ABSTRACT

Voice and alarm signalling capability between supervisory personnel at monitor and control sites located at separated transceiver facilities of a (repeatered) multichannel communication network is provided by a multichannel multiplexed encode/decode scheme in which voice and/or alarm signals generated at one station are digitally encoded and formatted so as to be inserted into the data stream of the normally conveyed data traffic over the active channels of the network. At the receiving terminal site, these inserted signals are removed from the high data rate digital data stream and delivered to decoding equipment which reconstructs the original voice and/or alarm signals for delivery to the audio equipment of station operation personnel. The encoded signals are inserted as overhead bits for each active channel, so that a fault on one channel will not prevent the completion of trasmission of the intended communication between terminal site personnel.

30 Claims, 4 Drawing Figures

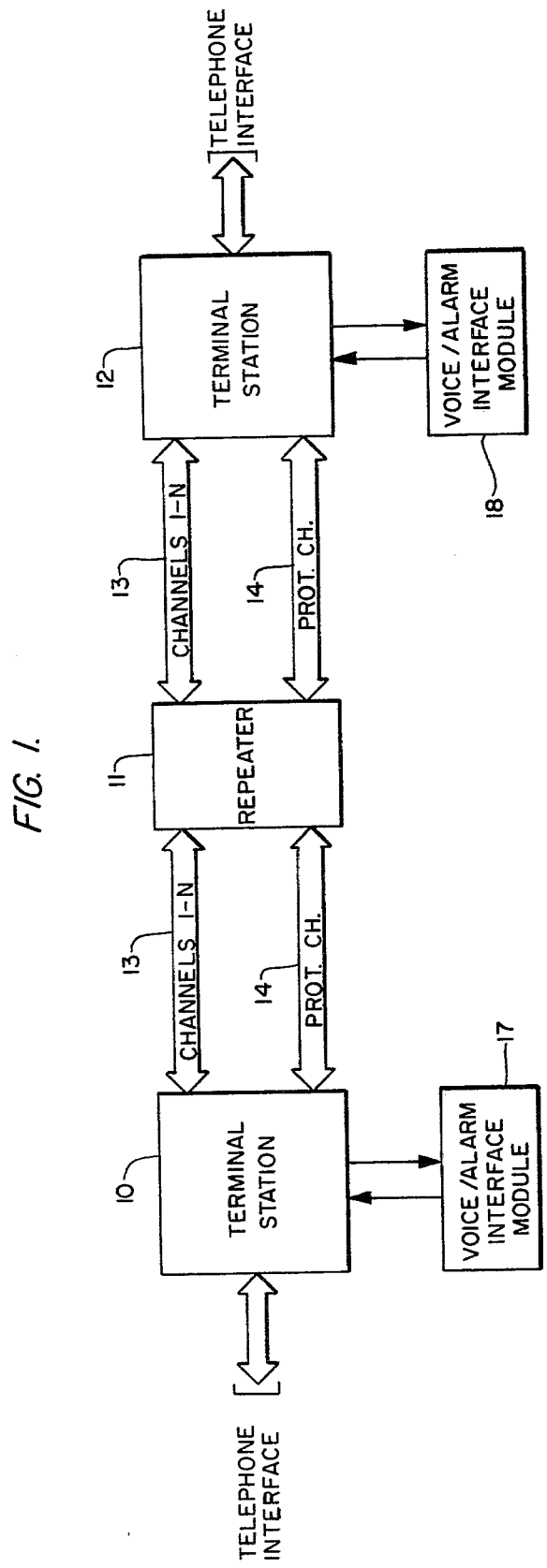

VOICE ALARM SIGNALLING SYSTEM

FIELD OF THE INVENTION

The present invention relates to communication systems and is particularly directed to a scheme for encoding and decoding voice and alarm signals used for network supervisory purposes in a repeatered, multi-channel communication network.

BACKGROUND OF THE INVENTION

In copending application Ser. No. 149,291, filed May 12, 1980 by P. Casper et al entitled Repeatered, Multi-Channel Fiber Optic Communication Network Having Fault Isolation System, assigned to the assignee of the present application, there is described a high data rate digital signalling environment wherein the transmission of high density signalling traffic, such as T-4 telephone trunk voice signals and data, is carried out over a plurality of fiber optic transmission channels between geographically relatively remote signal interfacing terminal stations. The terminal stations may be coupled to receive the signals to be transmitted from trunk interface port connections, microwave interface equipment, etc., and include electro-optic transceiver equipment for coupling multi-megabit digital data signals over a fiber optic communication network. At these stations processor-based control equipment is provided which serves to perform control and monitoring functions that govern the overall operation of the network. As is explained in the above-referenced application, the network includes protection equipment that serves to maximize the integrity of each channel, the protection equipment being substituted in place of a normally used fiber optic link in the event of unacceptable signal degradation or channel failure. The control and operation of this protection equipment as well as the control and operation of other portions of the system may be effected internally by way of the processor-based monitor and control equipment. These actions may also be carried out externally through operator intervention, bypassing an internally programmed control sequence when necessary.

Of course, as will be readily appreciated by those skilled in the art, it is common practice in sophisticated communication networks to employ operator command consoles through which monitor and control actions may be effected. In an environment where separate and remote facilities are provided for this purpose, such as in the environment of the network described in the above-identified application, some means of providing a signalling link, preferably a voice link, between the station operators is required in order that system supervisory personnel can communicate directly with each other and take whatever effective action is necessary to enable the network to perform as intended.

A common expedient for providing this voice signalling capability is a conventional telephone communication system through which the network operators call one another just as do other subscribers of the system. Unfortunately, this approach subjects the intended voice link between stations to the performance of the external telephone equipment, including circuit availability and channel integrity. In a fiber optic communication network such as that described in the above-referenced application, a major feature of the network is its use for conveying high density telephone trunk traffic between relatively remote stations over a plurality of fiber optic channels. If, in such a network, voice communications between station operators were to be conducted through external telephone equipment whose signals, in turn, were formatted for transmission over the very network being monitored and controlled by the station operators, it can be seen that serious consequences could result from a fault on the channel over which the voice signals for operator-to-operator communications were being conducted.

SUMMARY OF THE INVENTION

In accordance with the present invention, voice and alarm signalling capability between supervisory personnel at monitor and control sites located at the separated transceiver facilities of a (repeatered) multichannel communication network is provided by a multichannel multiplexed encode/decode scheme in which voice and/or alarm signals generated at one station are digitally encoded and formatted so as to be inserted into the data stream of the normally conveyed data traffic over the active channels of the network. These encoded signals are generated at a data rate considerably less than that of the high data rate signals conveyed by the network and are inserted (multiplexed) periodically as auxiliary or overhead data bits in the digital data stream of each active channel of the network. At the receiving terminal site, these overhead bits are demultiplexed from the high data rate digital data stream and delivered to decoding equipment which reconstructs the original voice and/or alarm signals for delivery to the audio equipment of station operation personnel. Because the encoded signals are inserted as overhead bits for each active channel, a fault on one channel will not prevent the completion of transmission of the intended communication between terminal site personnel. Moreover, by having redundant access to all of the channels over which the telephone traffic conveyed by the network is serviced, station operation personnel have the capability of monitoring the "ear-input" quality of the voice signals heard by the subscribers of the network.

In order to implement the required encoding and decoding functions for interfacing voice/alarm signals with the data traffic handled by each network channel, the system according to the present invention employs a voice/alarm interface module at each terminal site where network operation personnel monitor and supervise network performance. Each of these modules is coupled to receive and accept signals produced from a conventional telephone handset, such as dial pulses and voice signals, and includes tone signalling circuitry that generates a pair of tones to be used for station address signalling, and analog voice coupling circuits for voice signalling. The analog signals (dual tone or voice) are digitized via a companding A-D converter and formatted for delivery to the transceiver equipment inserted with each channel of the network for transmission as prescribed overhead bits of each active channel.

Each module also contains deformatting and D-A conversion circuitry which receives the serial overhead bits from any selected one of the active channels and reconstructs the original analog signals for delivery to the audio equipment of the terminal station. Part of each module is configured to detect station address signals, such as those produced by rotary dial, key tone, etc., signalling units. Station address and alarm signalling is effected through the use of the above-mentioned dual tone pair, the frequencies of which are chosen to prevent tone detection circuitry in the module from detecting voice inputs as address or alarm signals.

BRIEF DESCRIPTION OF THE DRAWINGS

FIG. 1 is a general block diagram of a repeatered, multichannel communication system in which the voice/alarm signalling scheme of the presesnt invention may be employed;

DETAILED DESCRIPTION

Figure 2A:
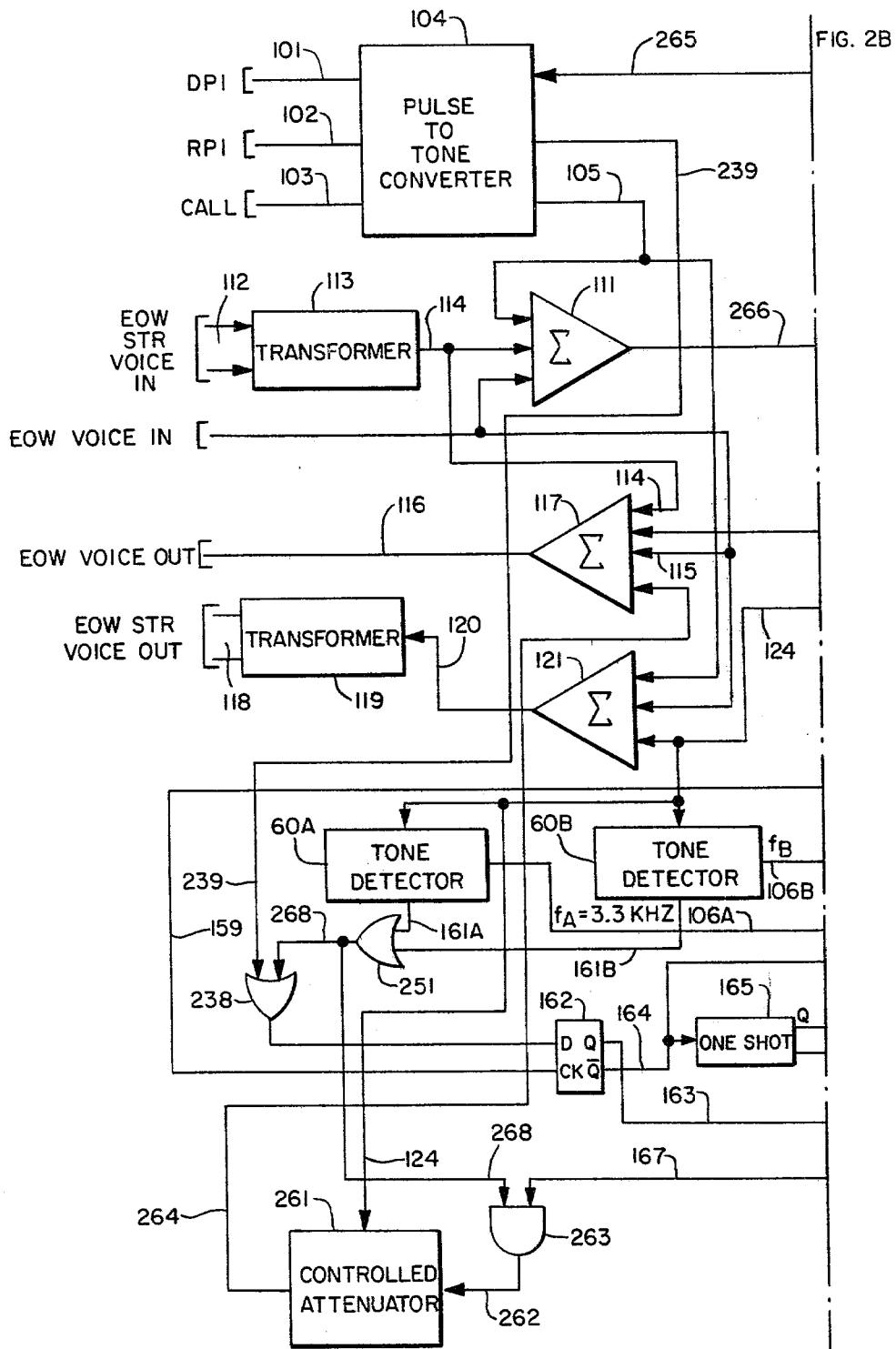
FIGS. 2A–2C, together form a schematic logic diagram of a voice/alarm interface module.

As was mentioned briefly above the present invention has particular utility in a repeatered, multichannel fiber optic communication network such as that described in the above-referenced application. However, it should be understood that the invention is not limited to such an environment but has application to the signalling links where data may be transmitted in a digitally encoded format. Still for purposes of facilitating the present description it will be assumed that the environment is that of a multichannel, repeatered, terminal-to-terminal communication network, a general illustration of which is shown in FIG. 1.

Referring now to FIG. 1, there is shown a general block diagram of a repeatered, multichannel communication network to which the present invention may be applied, where information is to be conveyed between geographically separated locations identified as a West location and an East location. For purposes of facilitating the description and illustration of the invention, the network will be reduced to a simplified communication configuration contained only two spaced apart locations between which information is to be conveyed. It should be understood however, that more than two separate locations may be interconnected with each other over respective network sections established between each pair of locations. FIG. 1 illustrates the configuration of an individual section of the network wherein a pair of terminal stations 10 and 12 geographically remote from each other at respective West and East locations are coupled together over a plurality of normally active transmission channels 13 and a protection channel 14 to be described further below. Where the overall network is comprised of more than only the two separate locations shown in FIG. 1, separate sections are associated with each pair of locations between which communications are to be conveyed, with the sections being linked together in a back to back chain configuration to complete the overall network. Since the network configuration will be assumed to be reduced to only a single section coupling a pair of geographically separated locations to each other, the terms network and section may be considered to be synonymous, except in a few isolated instances where reference to separate sections of a larger (than two) network will be made. For purposes of the present description it will be assumed that the information to be conveyed over the network is in the form of digitized telephone traffic, although it should be understood that the particular type of information transmitted via the system is not critical. The digitized telephone signals may represent voice, data, etc., namely, whatever signals may be digitized into a suitable format for high speed, high density data communication.

Situated at one end of the network at a West location and coupled to a telephone signalling interface (not shown) is a first terminal station 10. Terminal station 10 provides full duplex transmission capability between a telephone interface such as an interoffice trunk, or digital microwave interface and a multichannel communication highway such as the fiber optic highway described in the above-referenced application, comprised of an N-channel link 13 and a protection channel link 14. Each channel is configured of a pair of communication links, one for transmitting signals in one direction (e.g. West to East) and the other for transmitting signals in the reverse direction (e.g. East to West). In the present description it will be assumed that six channels make up the system, including five normally active or used channels and one normally quiescent or protection channel. It should be understood, however, that the number of channels that may be employed is not limited to the particular number chosen in the example described, but may be any suitable number as the need demands. The protection channel 14 is normally not used but is provided in the event of a failure of one of the five active channels of link 13.

From terminal station 10 at the West end of the network, fiber optic links 13 and 14 are coupled to a repeater 11 which is further coupled to additional links 13 and 14 to terminal station 12 at the opposite end or East end of the network. Repeater 11 provides the necessary signal regeneration to ensure proper signal transmission, via the channel links, reception and data recovery at the receiving terminal station 12. While only a single repeater 11 has been shown in FIG. 1 so as to simplify the drawing, it should be understood that more repeaters may be serially situated along the link between terminal stations 10 and 12 as the distance between terminal stations at opposite ends of the network increases.

Like terminal station 10, terminal station 12 provides full duplex transmission capability between an associated local telephone interface (not shown) and the multichannel communication highway. Each terminal station contains suitable data encoding/decoding transceiver equipment for coupling incoming digital telephone traffic onto respective ones of the channels 13 and 14 for transmission to the other station. This transceiver equipment provides for multiplexing the serialized digital telephone traffic with auxiliary or overhead data that is used for synchronization and control purposes. Although, as far as the present invention is concerned, the particular data format or multiplexing transceiver equipment that is used is not critical and will not be described in detail here, it may, advantageously, comprise components such as those described in the above referenced application and attention may be directed to that application for a detailed explanation of the same. Suffice it to say, for the purposes of the present description, that the multiplexing equipment of each terminal station is equipped to couple prescribed auxiliary or overhead bits in common to the transceiver equipment for each channel.

With this general communication network configuration providing the basic transmission facility to which the present invention may be adapted, terminal station 10 is further associated with a voice/alarm interface module 17 while terminal station 12 is coupled to its own respective voice/alarm interface module 18. It is through these modules that supervisory personnel in stations 10 and 12 communicate with each other using the repeatered channels of the network. The interface module receives input voice or alarm signals from an attendant at one terminal station, encodes these signals and applies them in common to each transceiver associated with channels 13 and 14 for redundant, parallel transmission to the other terminal stations. At the receiving terminal station the encoded voice/alarm data on one of the channels is selected and decoded by that station's voice/alarm interface module to reconstruct the original signal input by the attendant at the other terminal station. The configuration and operation of an individual interface module will be explained in detail below with reference to FIGS. 2A–2C.

Figure 2B:
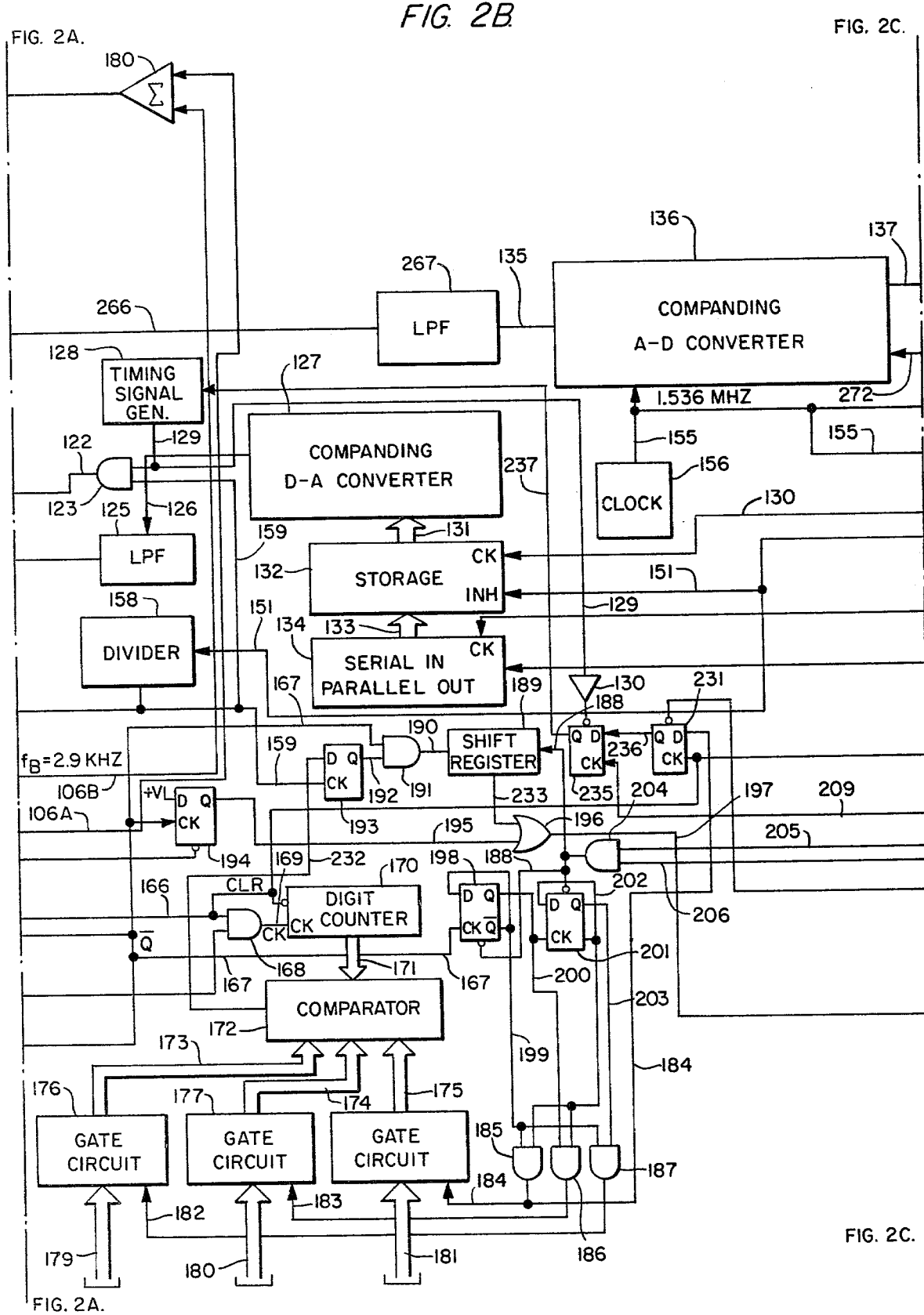
Figure 2C:
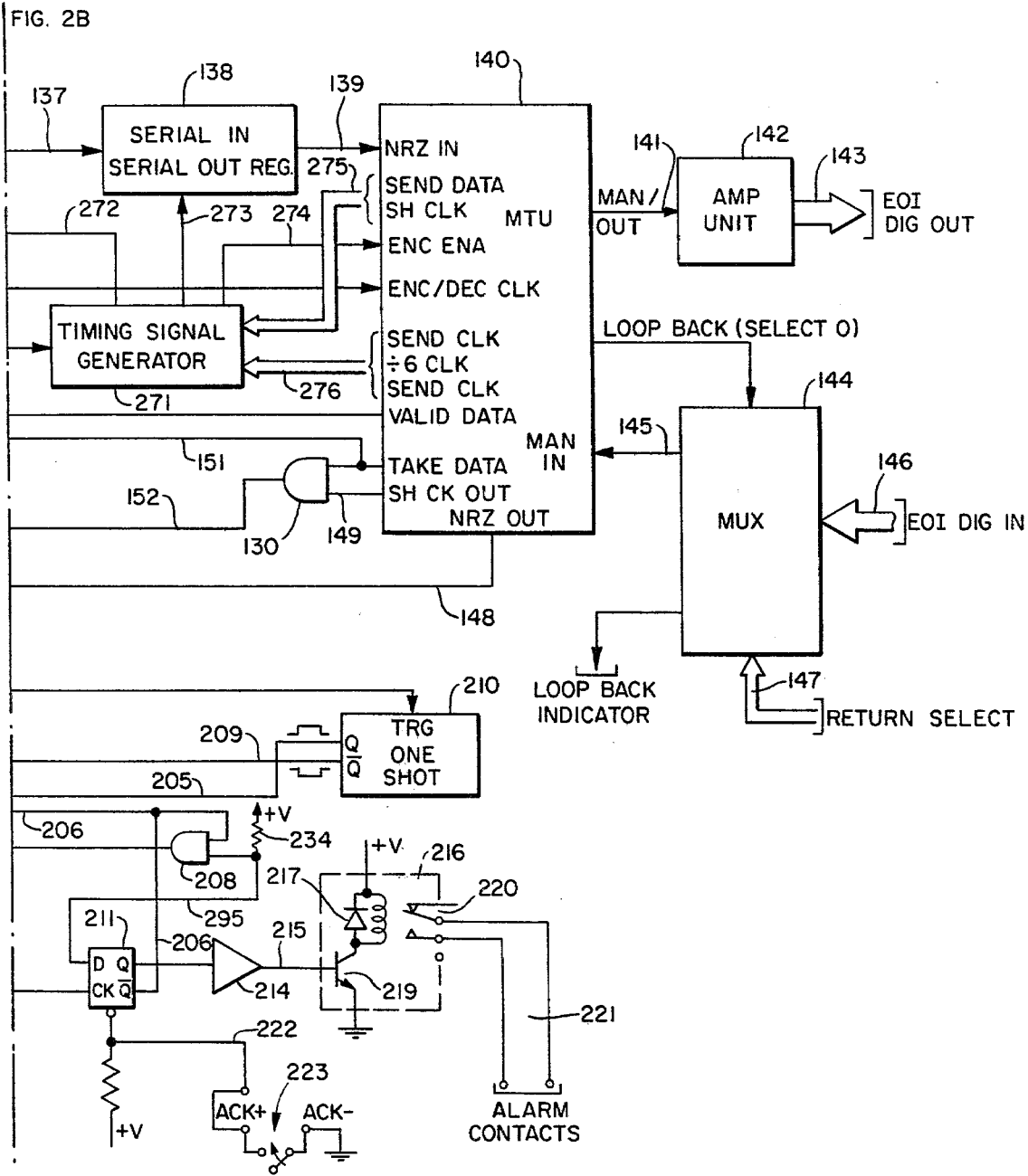

Referring now to FIGS. 2A–2C, there is shown in schematic block diagram form a voice/alarm, encode/decode interface module for implementing voice and alarm signal communications between terminal stations via the multichannel links of the network shown in FIG. 1. At one terminal station encoded alarm or voice signals are inserted into the data stream as overhead bits, transmitted over each of the available data links, and subsequently decoded at the addressed terminal station to recreate the transmitted alarm or voice. Telephone addressing schemes, such as rotary dial, frequency pulse keying, etc. are employed for identifying the terminal station being called. While only two terminal stations (10 and 12) have been referenced in conjunction with the description of the system, it is again to be understood that a communication system embraced by the present invention may include more than two terminals, each of which forms one end of a point-to-point multichannel link. With this capability, each terminal station will have a telephone number address that may be dialed from an attendant's handset at another terminal station and the description of the interface module to follow will explain the equipment associated with a respective terminal station for implementing the voice/alarm encoding and decoding functions necessary to convert the telephone address, alarm and voice signals into the proper format for a response and completed communication.

In order to facilitate an explanation of the voice/alarm interface module, the module may be considered to be subdivided into these section: 1—an encoding section which receives incoming dial pulse, voice or alarm audio signals, digitizes and encodes the signals and forwards the encoded digital signals onto the transceiver/multiplexer circuitry of the terminal station for transmission over each channel; 2—a decoding section which receives encoded digital signals transmitted from another terminal station, decodes the signals and outputs analog audio signals to the attendant's audio equipment. In the case of station address signals that identify the terminal station being called, the decoding section carries out address signal detection functions and energizes an alarm to the terminal station operator. Finally, there is an alarm monitoring section that responds to a longer than momentary signal lead input to energize an alarm. Each of these sections will be described separately below. For purposes of simplifying an understanding of the invention, the various sections of the voice/alarm interface module under consideration will be assumed to be those associated with the module 17 associated with terminal station 10.

ENCODING SECTION

When the attendant at terminal station 10 wishes to place a call to another terminal station (e.g. terminal station 12), the attendant addresses that station by way of a conventional handset signalling device, such as rotary dial, frequency pulse keys, momentary switch, etc. provided at the station. The type of signalling device used is not critical and merely provides means for addressing the voice/alarm interface module at another terminal station.

Input address signalling lines 101 for dial pulse signals, lines 102 for rotary pulse signals and lines 103 for momentary switch pulses (CALL) are coupled to a conventional pulse-to-tone converter 104 which produces a dual audio tone output at a selected pair of frequencies of 2.9 KHz and 3.3 KHz on line 105 in the presence of a closed contact pulse on any one of lines 101–103. The set of frequencies of 2.9 KHz and 3.3 KHz was chosen to ensure that the equipment will be capable of distinguishing between voice and tone signals. In some instances a voice frequency signal may have such a frequency content that it might be recognized as a tone signal. However, with the use of a pair of non-harmonically related frequencies spaced apart by the 400 Hz differential, which will not be duplicated by a voice signal, a clear line of demarcation between true voice signals and a true tone pair can be effected. The tone pair signals themselves are produced by a pair of tone generator/detector circuits 60A and 60B, the tone outputs $f_A = 3.3$ KHz and $f_B = 2.9$ KHz of which are coupled over lines 106A and 106B to be summed together in summing amplifier 180 and applied over line 265 to the tone input of pulse-to-tone converter 104. The pulse signals that are applied to converter 104 over one of input lines 101, 102 and 103 effectively gate the dual tone summation signal on line 265 and apply the resulting tone burst signal to output line 105. The gating pulses, per se, are coupled over output line 239 to one input of gate 238.

Line 105 is coupled to one input of each of summing amplifiers 111 and 121. The output of summing amplifier 111 is coupled over line 266 to a low pass filter 267. Summing amplifier 111 is also coupled to receive incoming voice signals from auxiliary voice interface circuitry at terminal station 10. For this purpose a strapped voice input twisted pair 112 is transformer coupled via isolation transformer 113 and line 114 to one input of summing amplifier 111. Line 114 is also coupled to one input of another summing amplifier 117, the output of which is coupled over line 116 to deliver applied audio signals (voice or tones) to the earphone or speaker of the attendant's audio set, e.g., handset or headset. The output of amplifier 121 is coupled over line 120 to an isolation transformer 119. The output of isolation transformer 119 is coupled via twisted pair 118 to strapped audio output equipment. Thus, through summing amplifier 117 and 121, the tone signals produced by converter 104 are applied to local audio equipment.

The tone or voice signals produced at the output of low pass filter 267 are coupled over line 135 to a companding A - D converter 136 which is clocked by a suitable clock generator 156 (1.536 MHz) via line 155. The output of clock generator 156 is further coupled to a timing signal generator 271 and to the ENCODE/DECODE CLOCK input of a multiplex terminal unit (MTU) 140. Timing signal generator 271 is comprised of suitably configured combinational logic to produce timing signals that control the operation of A - D converter 136, register 138 and MTU 140. The basic clock is derived from the 1.536 MHz clock on line 155 and generator 271 responds to outputs of MTU 140 on links 275 and 276 to produce sequential operational timing signals, described below. The sampled and quantized audio signal is digitized into a suitable code resolution, e.g., eight bits, to produce an eight-bit serial output code for each sample, which code is coupled over link 137 to serial shift register 138. The serial NRZ output of shift register 138 is supplied over line 139 to the NRZ IN terminal of (MTU) 140. (MTU 140 may comprise a commercially available NRZ-MANCHESTER-NRZ encoding/decoding unit such as an HD1-15531 unit manufactured by Harris Corporation). MTU 140 encodes the serial NRZ data on line 139 into a sixteen-bit Manchester word (3 sync bits, 8 data bits, 4 spare bits and 1 parity bit) at a suitable bit rate (128 Kbs) and outputs the encoded bipolar data over line 141 to buffer amplifier unit 142. Buffer amplifier unit 142 includes six amplifiers (for the five channels of link 13 and the one protection channel of link 14 shown in FIG. 1.) through which encoded data signals are converted to ECL logic levels and applied over link 143 to each of the five normally used and the one additional uplink transmission channel for application to the transceiver in terminal station 10 associated with each channel. As was pointed out above, the timing of the fetching of the digitized data by MTU 140 is controlled via timing signal generator 271 which responds to the 1.536 MHz clock on line 156 and the outputs of MTU 140 on links 275 and 276 to produce shift clock pulses on line 276 to read out the contents of register 138 and line 272 which delivers control timing signals to A-D converter 136 as MTU is ready to receive and encode more data samples. As a new audio data sample is to be encoded, timing signal generator 271 delivers an encode enable control signal over line 274 to the encode enable input of the MTU 140.

In operation, when the attendant at terminal station 10 places a call to terminal station 12, the address of the terminal station is applied via a dialing device to pulse-to-tone converter 104. Pulse-to-tone converter 104 pulses out an audio signal corresponding to the summed tone pair signals on line 265 from tone detector/generators 60A and 60B, in accordance with these pulses, on output lines 105 and 239. The tone pair on line 105 is coupled through summing amplifier 111 and low pass filter 267 to A - D converter 136, wherein the pulsed tone pair signals are digitized. These digital signals representative of the address of the called station are then encoded by MTU 140 and applied over each line of output link 143 to be applied in parallel to the transceiver units associated with each outgoing channel. Through the multiplexing circuitry of the transceiver units, the encoded tone pair address bits are inserted into the outgoing data streams of each channel and transmitted over each data link to the remote terminal station. In a similar manner, voice signals, either from the attendant's handset equipment or from auxiliary audio equipment, are coupled directly to the other inputs of summing amplifier 111 and subsequently digitized and enabled for transmission over each channel.

DECODING SECTION

The description of the decoding section of the module to follow will proceed from the standpoint of a received call from another terminal, i.e., the data contained in the received overhead bits that have been demultiplexed by the transceiver/demultiplexing equipment of the terminal station. It will also be assumed that the address tone pair designates the address of the terminal station 10.

Via a suitable thumbwheel switch located externally to the module, the attendant can select one of the six incoming channels to be monitored for address, voice/alarm data. The digital code produced by the setting of the thumbwheel switch will be applied over lines 147 which designate over which line the communication return from the other station is to be received. Accordingly, one of the lines of link 146, after appropriate logic level translation, is coupled via multiplexer 144 over line 145 to the Manchester data input of MTU 140. The incoming Manchester words that are comprised of successively received address or voice/alarm bits are decoded by MTU 140 into a twelve-bit NRZ data word (8 data bits, 4 spare bits) and supplied over line 148 to serial-in, parallel-out shift register 134. Clocking of the decoded NRZ words from MTU 140 into register 134 is controlled by TAKE DATA and SHIFT CLOCK OUT signals applied by MTU 140 over lines 151 and 149, respectively, to AND gate 150, the output of which is coupled via line 152 to the clock or shift control input of register 134. Line 151 is further coupled to a load inhibit input of a storage register 132 and to a counter 158. When MTU 140 detects valid data it supplies a VALID DATA signal on line 130 to the clock input of storage register 132, so that the decoded data byte clocked into serial-in, parallel-out register 134 may be loaded via link 133 in parallel into the eight stages of register 132.

The contents of storage register 132 are coupled over link 131 to companding D - A converter 127 which supplies an analog output over line 126 to lowpass filter 125. Filter 125 removes quantization noise from the audio signal and applies the resulting signal over line 124 to summing amplifier 121, tone detectors 60A and 60B and to a controlled attenuator 261. One input of AND gate 263 is coupled via line 268 to the output of OR gate 251, while a second input of AND gate 263 is coupled via line 167 to the $\overline{Q}$ outut of a retriggerable one-shot 165. The $\overline{Q}$ output of one-shot 165 is normally low except during receipt of incoming address dial pulses, as will be explained below. The output of AND gate 263 is coupled over line 262 to the control input of controlled attenuator 261, which contains a controlled active resistor, such as an FET, that reduces the amplitude of a tone signal output of filter 125 to a level acceptable for human hearing and applies the attenuated tone signal over line 264 to one input of summing amplifier 117 so that the incoming tone signals may be delivered to the attendant's voice output circuit.

In addition to the initial decoding of received tone and voice input signals, the voice/alarm interface module contains dial pulse/call and alarm signal monitoring circuitry which is capable of decoding the digits dialed or an alarm signal generated by either the local calling party or received over the multichannel link from a remote calling party. For incoming dialed address signals from a remote terminal station, such as terminal station 12 to terminal station 10, the module compares the dialed digits to its own station code and signals the attendant if it determines that the call is for terminal station 10. Circuitry is also included for generating a misdialing error signal if the dialed digits are not properly dialed by either the local calling party on an outgoing call, or by the remote calling party on an incoming call. If an alarm tone is generated by either party, this signal is also detected and causes a local alarm signal to be generated at each terminal station.

As was explained above, an incoming call will contain dialed digit tone pair pulses to be eventually followed by voice signals from the remote terminal. In the configuration shown in FIGS. 2A and 2B, the dial signal monitoring circuitry is capable of handling up to one thousand addresses, using a three digit dialed decimal number addressing scheme. It should be understood, of course, that the size of the address code is not critical and may be tailored to suit the requirements of the user without departing from the basic implementation of the present invention.

Now, using the three decimal digit addressing scheme referred to above, when a call is placed, the dialed decimal digits are encoded in a dual tone formal and delivered over the multichannel link to another terminal station. In the present example it will be assumed that terminal station 10 has the three digit decimal address 010, so that using rotary dial equipment, for example, at the remote calling station, the calling party will have dialed the sequence: ten pulses - one pulse - ten pulses. Thus, at terminal station 10 there will be received a sequence of ten tone pulses - one tone pulse - ten tone pulses. As the first received group of ten tone pulses are decoded and reproduced in analog form at the output of D - A converter 127 they are filtered by low pass filter 125 and applied to tone detectors 60A and 60B. The outputs of tone detectors 60A and 60B are coupled over respective lines 161A and 161B to OR gate 251. The output of OR gate 251 is coupled via line 268, OR gate 238 and line 252 to the D input of a flip-flop 162. Flip-flop 162 is clocked via line 159 from the output of a divide-by-ten counter 158 which is coupled via line 151 to the TAKE DATA output of MTU 140. The TAKE DATA output from MTU 140 provides a clock signal at 8 KHZ to control the sampling rate of converter 127, via register 132, and counter 158 divides this clock signal down to a value suitably less than half the sampling rate for proper tone signal monitoring. Thus, during the presence of tone pulses detected by either of tone detectors 60A and 60B, counter 158 will clock flip-flop 162 via line 159, causing its Q output line 163 to go low and its $\overline{Q}$ output line 164 to go high.

Line 163 is coupled to one input of an AND gate 168, a second input of which is coupled over line 166 to the Q output of retriggerable one-shot 165. Line 165 from the $\overline{Q}$ output of flip-flop 162 is coupled to the input of one-shot 165 and to the reset input of a flip-flop 194. The $\overline{Q}$ output of one-shot 165 is coupled via line 167 to the clock inputs of flip-flops 194 and 198. The D input of flip-flop 194 is strapped to +V, so that if line 164 is high, flip-flop 194 is set in response to an output signal from the $\overline{Q}$ output of one-shot 165 on line 167. The Q output of one-shot 165 is further coupled to the clear input of a dialed counter 170, to the clock input of flip-flop 231 and to the trigger input of a further one-shot 210.

The output of AND gate 168 is coupled to the clock input of dialed digits counter 170. Counter 170 counts the number of pulses produced for each dialed digit and couples its contents over link 171 to a comparator 172. Comparator 172 is also coupled via links 173, 174 and 175 to gate circuits 176, 177 and 178. Gate circuits 176–178 are coupled to BCD digit code links 179–181, respectively, the latter being hard-wired to prescribed logic levels that identify the digit address of terminal station 10. Thus, for the example chosen, link 179 will couple the 4-bit code "1010" to gate circuit 176, link 180 will couple the code "0001" to gate circuit 177 and link 181 will couple the code "1010" to gate circuit 178. Gate circuits 176–178 are sequentially enabled by AND gates 187, 186 and 185 respectively, as incoming dialed digit pulses are analyzed. For this purpose flip-flops 198 and 201 are coupled in cascade to form a stepping circuit that is incremented for each newly-received digit as a new delayed pulse is produced by one-shot 165. This action causes flip-flop 198 and 201 to selectively enable one of AND gates 187–185 as each new dialed digit tone pulse sequence is detected by tone detectors 106A and 106B. As was pointed out above, one-shot 165 is retriggerable and produces a pair of complementary delay pulses of a suitable width in response to a trigger signal at its input. This delay pulse width is wide enough to encompass the maximum time span of a dialed digit pulse. When a sequence of pulses that make up a digit is clocked through flip-flop 162 over line 164, one-shot 165 is repeatedly retriggered, thereby extending the width of the delay pulses on lines 166 and 167 until it times out after the last pulse of the digit. Therefore, AND gate 168 remains enabled for the entirety of the duration of the dialed digit.

As AND gates 187–185 are selectively enabled, the strapped BCD code input to one of gate circuits 176–178 is applied over a respective one of links 173–175 to comparator 172 to be compared with the dialed digit count accumulated in digit counter 170. If a match occurs, a signal is applied over line 232 to the D input of flip-flop 193.

Flip-flop 193 is clocked via line 159 by the output of divider 158. The Q output of flip-flop 193 is coupled over line 192 to one input of AND gate 191, the second input of which is coupled to the $\overline{Q}$ output of one-shot 165 via line 167 as described previously. Flip-flop 193 and AND gate 191 function to supply a dialed digit recognition signal for a respective dialed digit over line 190 to a shift register 189 when comparator 172 has detected a digit match, but the output of comparator 172 is prevented from being loaded into shift register 180 until the $\overline{Q}$ output of one-shot 165 changes state indicating that the length of time sufficient to cover the span of the last pulse of the dialed digit has elapsed.

Shift register 189 accumulates a count corresponding to the number of decimal digits employed for a station address (three in the present embodiment) and supplies an output signal over line 233 to OR gate 196 upon the completion of a successful three decimal digit address comparison by address comparator 172. The output of OR gate 196 is coupled over line 197 to the clock input of flip-flop 211, while the D input of flip-flop 211 is coupled over line 295 and resistor 234 to high potential (+V). The Q output of flip-flop 211 is coupled over line 212 to a relay driver 214, the output of which is coupled over line 215 to the base of a switching transistor 219 within a relay circuit 216. The collector of transistor 219 is coupled through the parallel connection of diode 217 and relay winding 218 to positive potential while the emitter of transistor 219 is grounded. Relay contacts 220 of relay circuit 216 are coupled to a signalling alarm (e.g. bell) through lines 221. The reset input of flip-flop 211 is coupled over line 222 to a normally open ACKNOWLEDGE SWITCH 223 that is depressed by the attendant in answer to the ringing alarm signal. A ringing alarm signal is generated when flip-flop 211 is set by a signal on line 197 from OR gate 196, which causes the Q output of flip-flop 211 to go high. This signal is coupled through buffer 214 to turn transistor 219 on and switch the contacts 220 of relay 216.

The $\overline{Q}$ output of flip-flop 211 is coupled to one input of AND gate 208 and to AND gate 204 via line 206, and is used to reset various components of the dialed digit monitoring circuitry in response to an ACKNOWL- EDGEMENT signal, as will be described more fully below. The output of AND gate 208 is coupled over line 207 to reset flip-flop 231. The output of AND gate 204, which is also coupled to line 206, is coupled via line 188 to clear flip-flops 198 and 201 and shift register 189. AND gate 204 also has an input coupled via line 205 to the Q output of one-shot 210. The $\overline{Q}$ output of one-shot 210 is coupled via line 209 to the clock input of flip-flop 235. The D input of flip-flop 235 is coupled to the Q output of flip-flop 231, the clock input of which is coupled to the Q output of one-shot 165, as explained previously. The D input of flip-flop 231 is coupled over line 184 to the output of AND gate 185. When AND gate 185 is enabled, so that the BCD code for the third digit is coupled via gate circuit 178 to comparator 172, the D input of flip-flop 231 goes high so that at the change in state of the Q output of one-shot 165, the Q output of flip-flop 231 goes high, indicating a completion of the loading and comparison of the third digit or complete number of the station address by digit counter 170 and comparator 172. After a time out interval governed by one-shot 210, flip-flop 235 is clocked via the $\overline{Q}$ output of one-shot 210 over line 209. If flip-flop 231 has been set by a recognition of three complete digits for terminal station 10, the Q output of flip-flop 231 will have been high causing the Q output of flip-flop 235 to go high in response to the clock pulse on line 209. The Q output of flip-flop 235 is coupled over line 237 to a timing signal generator 128. Generator 128 produces a low frequency (2 Hz) interruption signal for a brief period of time (5–10 sec.) and applies this signal over line 129 to one input of AND gate 123 and over line 129 and via inverter 130 to clear flip-flop 235. During the time out interval that timing signal generator 128 generates the 2 Hz signal, AND gate 123 interrupts the 800 Hz produced by divider 158 over line 159 to supply an audible tone over line 122 to summing amplifier 117. The purpose of the interrupted 800 Hz audio signal produced by AND gate 123 is to provide a misdialing error alarm signal to the local attendant.

As was pointed out above, for the purpose of describing a working example, the dialed digit address of terminal station 10 is assumed to be the BCD address "010". This address will be strapped in BCD format with the appropriate logic levels applied over links 179 through 181 to gate circuits 176 through 178. When the initial dialed digits of an incoming call for terminal station 10 are reconstructed by companding D - A converter 127, they are coupled through low-pass filter 125 and the successive tones are decoded into digital pulses by tone detectors 60A and 60B. These pulses are coupled through gates 251 and 238 and applied to the D input of flip-flop 162, which is clocked by the output of divider 158. Flip-flop 162 effectively removes undesired transients in the output of tone detectors 60A and 60B and applies the pulses as they are received to AND gate 168. As the pulses are clocked through flip-flop 162, the initial change in state of the $\overline{Q}$ output of flip-flop 162 on line 164 triggers retriggerable one-shot 165. For the first pulse, the Q output of one-shot 165 goes high for a prescribed period of time, (for example 200 milliseconds to cover the greatest width of any pulse within a digit that may be encountered) while the $\overline{Q}$ output of one-shot 165 goes low for the same period of time. Incoming pulses are thereby gated through gate 168 and counted by digit counter 170. In addition, during receipt of the tone pair pulses, AND gate 263 is enabled thereby inserting a resistor in the path between output line 124 from filter 125 and input line 264 to summing amplifier 117 so as to make the audio level of the tone pulses acceptable to the attendant.

The state of flip-flops 198 and 201 at this time are such as to initially enable AND gate 187 and thereby gate circuit 176 so that comparator 172 will compare the contents of the digit counter 170 with the strapped digit code on input link 179. When one-shot 165 has timed out through the last pulse of the first digit received, its Q and $\overline{Q}$ outputs change state, thereby enabling AND gate 191. If the contents of the first digit and the first strapped digit of the terminal station match, comparator 172 will have caused flip-flop 193 to be set, thereby enabling both inputs of AND gate 191 and causing an initial pulse to be loaded into shift register 189, as one-shot 165 changes state.

As the next two digits are received, the above oeprations are repeated and the contents of shift register 189 are advanced until three successive digits have been recognized and therefore three pulses have been loaded into shift register 189. At this time, the contents of the third stage will cause the output on line 233 to go high, thereby applying a signal to the clock input of flip-flop 211 over line 197. This sets flip-flop 211 and thereby energizes relay circuit 216 to cause the alarm contacts that are coupled to lines 221 to be closed, and energize whatever circuit is coupled to the alarm contacts, such as a bell circuit. To answer a call, the attendant momentarily depresses the acknowledge switch 223, thereby resetting flip-flop 211 and terminating the alarm. The resetting of flip-flop 211 further enables AND gate 208 and AND gate 204. Time out one-shot 210 which was triggered by the output of one-shot 165 eventually has its ouptuts change state, thereby causing flip-flops 198, 201 and 231 to be reset and shift register 189 to be cleared, so that, again, for subsequent calls the dialed digits that identify the address of terminal station 10 may be recognized and decoded, with the alarm eventually energized.

Subsequent voice signals from the calling station are coupled through low-pass filter 125, as well as summing amplifiers 117 and 121 to the local orderwire output circuits to the attendant. During receipt of voice signals, the attenuating action of controlled attenuator 261 is not activated as AND gate 263 is disabled.

If the digits decoded by comparator 172 have failed to match the strapped digit code for the terminal station, namely, the call was addressed to another terminal station, the output of comparator 172 would not have caused flip-flop 193 to be set, so that shift register 189 would not have been loaded with three consecutive pulses identifying a satisfactory comparison for all three digits. As a result, flip-flop 211 would not have been set and no alarm would have been generated by relay circuit 216. Eventually, one-shot 210 would have produced an output over line 205 to reset the components of the decoding circuitry, just as the end of a normal digit detection.

If the calling party does not dial a complete number then, as flip-flops 198 and 201 are incremented to count each dialed digit, the output of AND gate 185 will be of such a level as to change the state of flip-flop 231. As a result, the input to flip-flop 235 will be of a state such that when one-shot 210 times out, the output of flip-flop 235 supplies a signal over line 237 to timing signal generator 128. Timing signal generator 128 produces an interrupting two Hz signal over line 129 for a period of 5–10 seconds so that AND gate 123, which also receives the 800 Hz output of divider 158, supplies an interrupted 800 Hz tone over line 122 summing amplifier 117 advising the local attendant of an incorrectly dialed number. At the end of the interrupting period, the state of line 129 is such that inverter 130 clears flip-flop 135 and removes the dialing error signal tone.

ALARM MONITORING SECTION

In addition to signalling the attendant for the receipt of a sequence of dialed digits, the interface circuitry is also capable of detecting an alarm signal, namely a continuous tone in excess of a prescribed period of time, (for example, considerably greater than the time out period of one-shot 165 or 200 milliseconds). Typically, the depression of the momentary switch on the attendant's console through which a call tone is provided will be on the order of one-third to one-half a second. This tone will cause a steady output to be provided on line 164 from flip-flop 162, so that flip-flop 194 will be set and supply a signal line 195 through OR gate 196 to set flip-flop 211 and thereby energize the alarm via relay circuit 216. The attendant then answers the alarm by depressing the ACKNOWLEDGE switch 223 to reset flip-flop 211 and thereby disable relay circuit 216, as discussed above.

The above described digit decoding and alarm monitoring sections also operate to monitor the proper dialing of an outgoing call. The pulses that are applied over one of the lines 101-103 to pulse-to-tone converter 104 are applied over line 239 through gate 238 to the D input of flip 162. The remainder of the circuitry operates in the same manner described above for incoming pulse signals applied over line 268 to gate 238 in response to incoming tone pulse signals.

As will be appreciated from the foregoing description of the present invention, voice and alarm signalling capability between supervisory personnel at monitor and control sites located at the separated transceiver facilities of a (repeatered) multichannel communication network is provided exclusive of normal telephone equipment by a multichannel multiplexed encode/decode scheme in which voice and/or alarm signals generated at one station are digitally encoded and formatted so as to be inserted, directly at the end of the network, into the data stream of the normally conveyed data traffice over the active channels of the network. Because the encoded signals are inserted as overhead bits for each active channel, a fault on interfaced telephone equipment or on one of the channels will not prevent the completion of transmission of the intended communcation between terminal site personnel. Moreover, by having redundant access to all of the channels over which the telephone traffic conveyed by the network is serviced, station operation personnel have the capability of monitoring the "ear-input" quality of the voice signals heard by the subscribers of the network.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

We claim:

1. In a multichannel communication network wherein information signals are conveyed among a plurality of subscribers by way of a transceiver station to which said information signals are interfaced and transmitted therefrom over respective ones of a plurality of data conveying channels, a system for carrying out voice and/or alarm communications between said transceiver stations comprising:

first means, disposed at a calling transceiver station, for encoding voice and/or alarm signals applied thereto and causing said encoded voice and/or alarm signals to be asynchronously transmitted over each of said plurality of channels so as to be conveyed thereby in addition to said information signals to a called transceiver station, so that the same encoded voice and/or alarm signal that is transmitted over one of said data conveying channels is also conveyed over every other one of said plurality of channels; and second means, disposed at said called transceiver station, for decoding the asynchronously transmitted encoded voice and/or alarm signals conveyed over a selected one of said plurality of channels and thereby reconstructing said voice and/or alarm signals.

2. A system according to claim 1, further including third means, disposed at said calling transceiver station, for encoding address signals identifying a called transceiver station and causing said address signals to be applied to each of said plurality of channels so as to be conveyed thereby to said called transceiver station; and fourth means, disposed at said called transceiver station, for decoding the encoded address signals coupled over a selected one of said plurality of channels and generating an incoming call indication signal upon detecting that the decoded address corresponds to the address of said called station.

3. A system according to claim 2, wherein said third means includes means for generating pulsed multi-tone signals representative of the address of said called transceiver station, and encoding means, coupled to said generating means, for encoding said pulsed multi-tone signals into a format compatible with said information signals.

4. A system according to claim 3, wherein said fourth means includes means for receiving said multi-tone signals generated and encoded by said third means and providing pulse output signals representative of the address of the called transceiver station, and means for comparing said pulse output signals with an address code representative of a prescribed transceiver station address and generating said incoming call indication signal upon detecting that said pulse output signals correspond to said address code.

5. A system according to claim 4, wherein each station includes means, coupled to said third and fourth means, for generating a prescribed output signal indicating that address signals applied to said third means or decoded by said fourth means are insufficient to identify the address of a transceiver station.

6. A system according to claim 1 wherein said first means includes means for encoding said voice and/or alarm signals into a format compatible with said information signals.

7. A system according to claim 6, wherein each transceiver station includes means for multiplexing said voice and/or alarm signals with said information signals.

8. A system according to claim 2, wherein said calling transceiver station includes encoder means for encoding both said voice and/or alarm signals and address signals applied thereto.

9. A system according to claim 3, wherein said encoding means is coupled to encode both said voice and/or alarm signals and said pulsed multi-tone signals.

10. A system according to claim 3, wherein said second and fourth means includes a common decoding means, coupled to receive encoded voice and/or alarm signals or address signals coupled over said selected one of said plurality of channels to thereby obtain said reconstructed voice and/or alarm signals or pulsed multi-tone signals.

11. A system according to claim 4, wherein
said calling transceiver station further includes
means for generating a multi-tone signal of a duration longer than that of a pulsed multi-tone signal, said encoding means being coupled to encode said longer duration multi-tone signal, and wherein
said called transceiver station includes
fifth means for decoding said encoded longer duration multi-tone signal and thereby recovering said encoded longer duration multi-tone signal and thereby recovery of said longer duration multi-tone signal to produce an output signal of a duration longer than said pulse output signals that are representative of the address of the called transceiver station, and
sixth means, coupled to said fifth means, for generating an alarm signal in response to said longer duration output signal.

12. A system according to claim 3, wherein each transceiver station includes means for providing an audio output corresponding to said voice and/or alarm signals or multi-tone signals and includes means for controllably reducing the amplitude of said audio output in response to said multi-tone signals.

13. A system according to claim 3, wherein said third means includes pulse-to-pulse converter means, responsive to input pulse signals representative of the address of a transceiver station, for generating said pulse multi-tone signals in accordance therewith.

14. A system according to claim 13, wherein each station includes means, coupled to said third and fourth means, for generating a prescribed signal indicating that the address representative pulse signals applied to said pulse-to-tone converter or decoded by said fourth means are insufficient to identify the address of a transceiver station.

15. A system according to claim 14, wherein said prescribed signal generating means includes means for counting the number of address signals represented by said pulse signals and causing said prescribed signal to be generated upon the failure to receive a specified number of address signals.

16. A system according to claim 15, wherein said counting means includes means for causing said prescribed signal to be generated upon the failure to receive said specified number of address signals within a preselected period of time.

17. In a multichannel communication network wherein plural channels of multiplexed digital telephone voice and data signals are conveyed among a plurality of subscribers by way of relatively remote transceiver stations to which said multiplexed digital telephone voice and data signals are interfaced and transmitted therefrom over respective ones of plural data conveying channels interconnecting said transceiver stations, a system for carrying out voice and/or alarm communications between said transceiver stations exclusive of telephone signalling equipment through which said multiplexed digital telephone voice and data signals are coupled to said stations comprising:
first means, disposed at a calling transceiver station, for encoding voice and/or alarm signals to be asynchronously transmitted in parallel over each of said plural voice and data conveying channels so as to be conveyed thereby in addition to said multiplexed digital telephone voice and data signals to a called transceiver station, so that the same encoded voice and/or alarm signal that is transmitted over one of said voice and data conveying channels is also conveyed over every other one of said plural voice and data conveying channels; and
second means, disposed at said called transceiver station, for decoding the encoded voice and/or alarm signals conveyed over a selected one of said voice and plural data conveying channels and thereby reconstructing said voice and/or alarm signals.

18. A system according to claim 17, further including third means, disposed at a calling transceiver station, for encoding address signals identifying a called transceiver station and causing said address signals to be applied to each of said plural data conveying channels so as to be conveyed thereby to said called transceiver station; and
fourth means, disposed at said called transceiver station, for decoding the encoded signals coupled over a selected one of said plural data conveying channels and generating an incoming call indication signal upon detecting that the decoded address corresponds to the address of said called transceiver station.

19. A system according to claim 18, wherein said first and third means include means for encoding said voice and/or alarm signals and address signals respectively into a format compatible with said multiplexed digital telephone voice signals.

20. A system according to claim 19, wherein said calling transceiver station includes encoder means for encoding both said voice and/or alarm signals and address signals applied thereto.

21. A system according to claim 20, wherein said third means includes
means for generating pulsed multi-tone signals representative of the address of said called transceiver station, said encoding means encoding said pulsed multi-tone signals into said compatible format.

22. A system according to claim 21, wherein said fourth means includes
means for recovering said multi-tone signals generated and encoded by said third means and providing pulse output signals representative of the address of the called transceiver station, and
means for comparing said pulse output signals with an address code representative of a prescribed transceiver station address and generating said incoming call indication signal upon detecting that said pulse output signals correspond to said address code.

23. A system according to claim 18, wherein each station includes means, coupled to said third and fourth means, for generating a prescribed output signal indicating that address signals applied to said third means or decoded by said fourth means are insufficient to identify the address of a transceiver station.

24. A system according to claim 21, wherein
said calling transceiver station further includes
means for generating a multi-tone signal of a duration longer than that of a pulsed multi-tone signal, said encoding means being coupled to encode said longer duration multi-tone signal, and wherein
said called transceiver station includes
fifth means for decoding said encoded longer duration multi-tone signal and thereby recovering said longer duration multi-tone signal to produce an output signal of a duration longer than said pulse output signals that are representative of the address of the called transceiver station, and
sixth means, coupled to said fifth means, for generating an alarm signal in response to said longer duration output signal.

25. A system according to claim 21, wherein each transceiver station includes means for providing and audio output corresponding to said voice and/or alarm signals or multi-tone signals and includes means for controllably reducing the amplitude of said audio output in response to said multi-tone signals.

26. A system according to claim 21, wherein said third means includes means, coupled to said third and fourth means, for generating a prescribed signal indicating that the address representative pulse signals applied to said pulse-to-tone converter or decoded by said fourth means are insufficient to identify the address of a transceiver station.

27. A system according to claim 26, wherein each station includes means, coupled to said third and fourth means, for generating a prescribed signal indicating that the address representative pulse signals applied to said pulse-to-tone converter or decoded by said fourth means are insufficient to identify the address of a transceiver station.

28. A system according to claim 27, wherein said prescribed signal generating means includes means for counting the number of address signals represented by said pulse signals and causing said prescribed signal to be generated upon the failure to receive a specified number of address signals.

29. A system according to claim 28, wherein said counting means includes means for carrying said prescribed signal to be generated upon the failure to receive said specified number of address signals within a prescribed period of time.

30. A system according to claim 21, wherein said second and fourth means includes a common decoding means, coupled to received encoded voice and/or alarm signals or address signals coupled over said selected one of said plurality of channels to thereby obtain said reconstructed voice and/or alarm signals or pulsed multi-tone signals.

* * * * *